(12) United States Patent
Azibert et al.

(10) Patent No.: US 6,935,632 B2
(45) Date of Patent: Aug. 30, 2005

(54) AUTOMATICALLY DISENGAGING SPACING MECHANISM FOR A MECHANICAL SEAL

(75) Inventors: Henri V. Azibert, Windham, NH (US); Wayne E. Spritz, Swampscott, MA (US)

(73) Assignee: A. W. Chesterton Company, Stoneham, MA (US)

( * ) Notice: Subject to any disclaimer, the term of this patent is extended or adjusted under 35 U.S.C. 154(b) by 0 days.

(21) Appl. No.: 10/376,415

(22) Filed: Feb. 28, 2003

(65) Prior Publication Data

US 2004/0169336 A1 Sep. 2, 2004

(51) Int. Cl.⁷ .............................................. F16J 15/34
(52) U.S. Cl. .................. 277/370; 277/371; 277/372; 277/373
(58) Field of Search ................... 277/370, 371, 277/372, 373

(56) References Cited

U.S. PATENT DOCUMENTS

| | | | |
|---|---|---|---|
| 3,627,390 A | * | 12/1971 | Irwin .......................... 384/478 |
| 3,947,044 A | * | 3/1976 | Friedrich ..................... 277/411 |
| 5,221,095 A | * | 6/1993 | Orlowski ..................... 277/303 |
| 5,267,736 A | * | 12/1993 | Pietsch et al. ............... 277/308 |
| 5,577,738 A | * | 11/1996 | Fukuda ........................ 277/370 |
| 5,711,532 A | | 1/1998 | Clark et al. .................... 277/38 |
| 5,725,220 A | | 3/1998 | Clark et al. ................... 277/9.5 |
| 5,913,520 A | | 6/1999 | Clark et al. .................. 277/370 |
| 6,250,642 B1 | * | 6/2001 | Ciotola ........................ 277/370 |

* cited by examiner

*Primary Examiner*—Heather Shackelford
*Assistant Examiner*—Enoch Peavey
(74) *Attorney, Agent, or Firm*—Lahive & Cockfield, LLP; Anthony A. Laurentano, Esq.

(57) ABSTRACT

A spacing mechanism is provided for locating at least one rotatable component relative to a stationary component of a mechanical seal. The spacing mechanism is configured to automatically disengage from the rotatable seal component, and/or its associated hardware, upon rotation of the rotatable seal component. The spacing mechanism may be configured to axially and/or radially locate one or more rotatable components relative to one or more stationary components and may be configured to automatically disengage from the rotatable seal component by the rotation of the rotatable seal component.

43 Claims, 8 Drawing Sheets

AUTOMATICALLY DISENGAGING SPACING MECHANISM FOR A MECHANICAL SEAL

TECHNICAL FIELD

The present invention relates to mechanical seals, and specifically relates to the use of a spacing mechanism suitable for use in mechanical seals for radially and/or axially positioning selected seal components.

BACKGROUND

Mechanical seals are used to provide a seal around a rotating shaft. For example, mechanical seals may be used for providing a fluid-tight seal between a rotating shaft and a stationary structure. For proper operation, rotatable seal components are typically secured to the shaft and stationary seal components are typically secured to the structure. The relative location of the rotatable and stationary components within the mechanical seal is important in order to allow for the proper operation of the mechanical seal components. Radially locating the mechanical seal components in this manner is typically known as "centering" the stationary components around the shaft, thereby locating the stationary components relative to the rotating components of the mechanical seal. It is understood that "centering" is not limited to precisely locating the seal components to be centered with respect to the shaft, the structure or other seal components. Axially locating the mechanical seal components along the axis of the shaft may be described as "axially spacing" or "setting" the rotatable components along the shaft. Centering and axial spacing are often performed by the use of centering or setting clips that are mounted to a portion of the mechanical seal (rotatable or stationary) and are manually set to contact the other portion (respectively stationary or rotatable) of the mechanical seal, when the shaft is at rest, thereby positioning the rotatable components relative to the stationary components of the mechanical seal. In order to allow for rotation of the shaft, the centering or setting clips are manually removed.

Some conventional approaches to minimize the labor required to remove the clips involve forming the clips of a wearable material that can be left in place during rotation of the shaft. One such example of spacing clips can be found in U.S. Pat. No. 5,913,520. However, wearable material clips that are left in place may introduce wear on the shaft or its associated hardware and cause heat generation issues that may be undesirable. Seal component positioning accuracy may be enhanced by the use of a hard material because the hard material inhibits variations in the spacing clip dimensions.

SUMMARY OF THE INVENTION

The present invention addresses the difficulties in the art by the use of one or more spacing mechanisms that are configured to automatically disengage from at least one rotatable seal component upon rotation of the rotatable seal components, such as by rotation of the shaft. According to various implementations of the invention, one or more spacing clips may be provided to radially and/or axially position the components of the seal relative to each other while the shaft is at rest, and then rotate upon rotation of the shaft so as to disengage from the rotatable seal component. By use of the present invention, a wide variety of materials are available for manufacturing the spacing clip, thereby allowing the use of hard, non-wearable materials. Spacing clips formed of hard material inhibit variations in centering or setting clip dimensions, thereby enhancing accuracy in the positioning of the rotatable components of the mechanical seal relative to stationary seal components As used herein, the term "spacing mechanism" is intended to include any component or assemblage of components that are used to radially and/or axially position the rotatable components of the mechanical seal relative to stationary seal components. The axial positioning of the components is referred to as "setting", and the radial positioning of the components is referred to as "centering." The spacing mechanism of the present invention may be configured to perform only one or both functions. The term "stationary," as used herein, refers to a structure that may be mobile and/or moving, but is not required to rotate with the shaft. As used herein, the term "rotatable" refers to components that rotate, such as with the rotation of the shaft, relative to the stationary components of the mechanical seal.

According to the present invention, a spacing mechanism is provided for locating the rotatable components relative to the stationary components of a mechanical seal. The spacing mechanism may be provided with an engaging portion that is adapted to engage at least one rotatable component when the shaft is at rest. The engaging portion is moveable relative to the rotatable components and may be constructed and located such that the engaging portion automatically disengages upon rotation of the shaft.

The invention may also include a mechanical seal providing a seal along the shaft by the use of a rotatable seal ring, a gland and a stationary seal ring. The seal also includes a spacing mechanism, such as a spacing clip. The rotatable seal ring is adapted to be coupled to the shaft and the stationary seal ring is coupled to the gland and positioned relative to the rotatable seal ring to form a seal. The spacing clip can be mounted to the gland. The spacing clip is also adapted to extend toward and engage a rotatable component of the seal to locate the stationary components relative to the shaft before the shaft is rotating and retract (i.e., move or pivot) from the rotatable component upon rotation of the shaft.

The spacing mechanism for positioning rotatable components relative to stationary components of a mechanical seal may include a spacing pin mounted to at least one component of the mechanical seal. A spacing clip is mounted to the spacing pin and is moveable relative to the centered and/or set component to engage and to disengage from the component. This spacing mechanism can engage the component when the shaft is at rest and disengage from the component upon rotation of the shaft.

According to a further aspect of the invention, a spacing mechanism for locating rotatable components relative to stationary components of a mechanical seal is provided having a spacing pin mounted to at least one component of the mechanical seal and defining a first axis along a longitudinal axis of the spacing pin. The spacing mechanism also includes a spacing clip that is mounted to the spacing pin and is moveable about the first axis and may have a constant radius from the first axis along one end of the spacing clip and is adapted for engagement with a rotatable seal component when the rotatable seal component is at rest. In this implementation, the spacing clip disengages by rotation of the rotatable seal component, such as by rotation of a shaft.

Further, the invention features a mechanical seal that provides a seal along a shaft by the use of a rotatable seal ring, a gland, a stationary seal ring, a lock ring and a spacing mechanism. The rotatable seal ring is adapted to be coupled to the shaft, and the stationary seal ring is coupled to the gland and interfaces with the rotatable seal ring. The spacing mechanism may include a spacing pin that is mounted to the gland and/or other stationary component, and a spacing clip. The lock ring is mounted to the shaft, and the spacing clip is mounted to the spacing pin and is moveable relative to the lock ring to engage and disengage from the lock ring. Thus, the spacing clip is adapted to engage the lock ring when the shaft is at rest and disengage from the lock ring upon rotation of the shaft.

According to another implementation of the invention, a method of operating a mechanical seal is provided. First, at least one spacing mechanism is positioned to locate a rotatable component at rest relative to a stationary component of the mechanical seal. Next, the rotatable seal component is rotated to automatically disengage the spacing mechanism from the rotatable seal component or stationary seal component.

BRIEF DESCRIPTION OF THE DRAWINGS

The invention will be apparent from the description herein and the accompanying drawings, in which like reference characters refer to the same parts throughout the different views.

DETAILED DESCRIPTION

Figure 1:
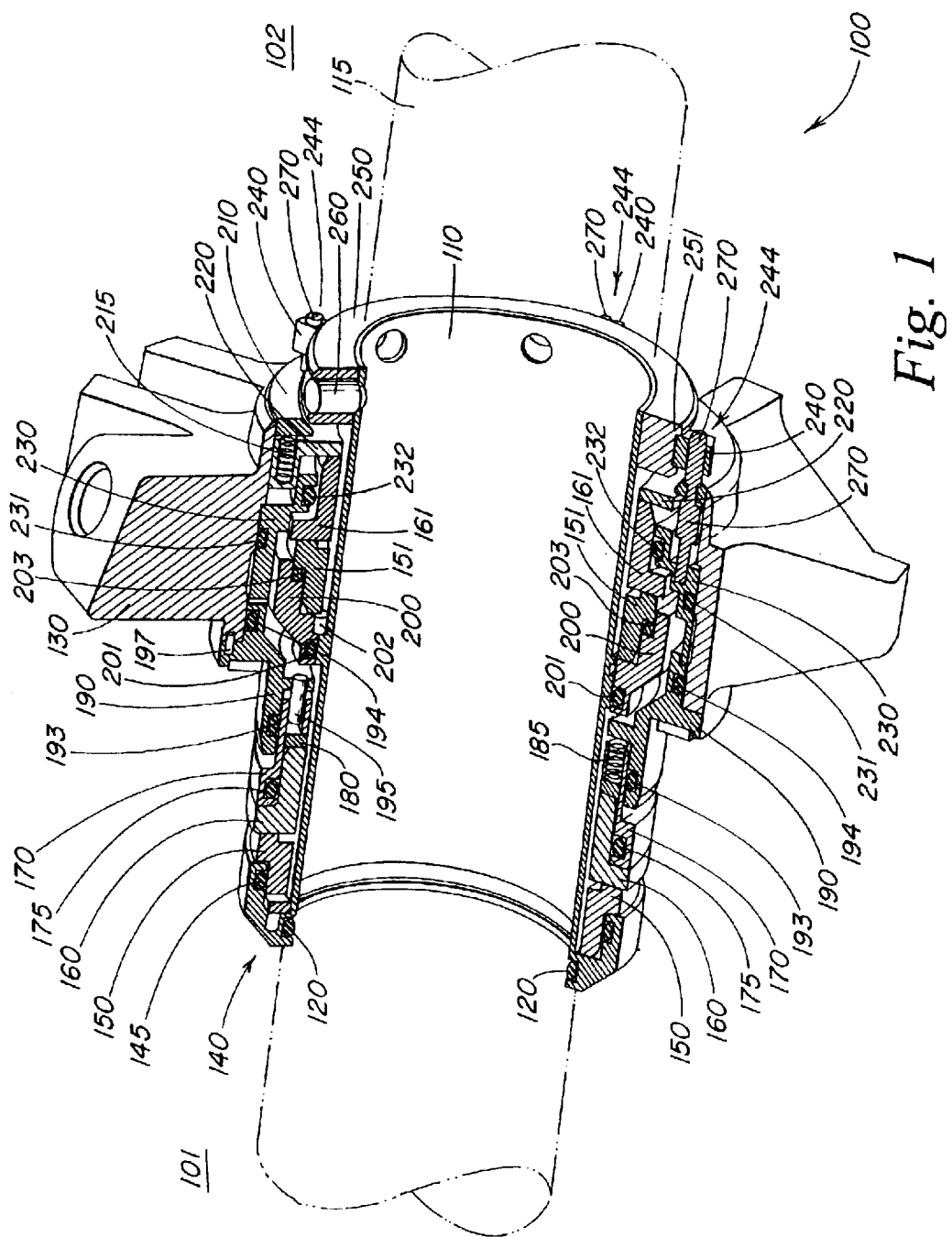
FIG. 1 is a perspective view of a cutaway of a mechanical seal according to an embodiment of the invention.

As illustrated by way of example in FIG. 1, a mechanical seal 100 is designed to provide a fluid-tight seal between fluids on a process side 101 of the seal and an external or ambient side 102 of the seal, while concomitantly allowing rotation of the shaft 115 relative to a gland 130 and any housing or other structure mounted to the gland 130.

The present invention is directed to locating the rotatable components relative to the stationary components of the mechanical seal. Specifically, the present invention can provide one or more spacing mechanisms that engage at least one of the rotatable components when the shaft is at rest, and then automatically disengage therefrom upon rotation of the shaft. Although the invention is applicable to a wide range of mechanical seals, including dual seals, tandem seals, gas seals, spiral-type seals, split seals, radial gap seals, lip seals and the like, the implementation of the invention with a sample mechanical seal is described in detail herein for the purposes of illustration. The mechanism of the present invention can be used with any type of seal employing rotatable and stationary components. The spacing mechanism can also be employed with seals that accommodate reciprocating motion, and to any other type of device where the spacing of components which operate in relatively-spaced motion is required.

With reference to FIG. 1, beginning at the process side 101, a sleeve seal 140 is provided. The sleeve seal 140 is mounted to or integral with the sleeve 110 and includes a seal 120, such as an O-ring, for forming a seal between the sleeve 110 and the shaft 115. As known in the art, the sleeve 110 is adapted to be mated to a shaft 115 that may be located within the sleeve 110 to inhibit relative rotation between the sleeve 110 and the shaft 115, such as by the use of set screws and/or a slip fit of the sleeve 110 to the shaft 115. A second seal 145 may be provided for interfacing with and forming a seal between the sleeve 110 and an outer surface of a rotatable seal ring 150. The rotatable seal ring 150 is positioned adjacent to a stationary seal ring 160 to form a pair of sealing faces, as is known in the art.

A shuttle 170 may be provided with an annular groove for sealing a third seal 175 that forms a seal between the shuttle 170 and the stationary seal ring 160. The rotatable seal ring 150 is coupled to and hence rotates with the sleeve 110, while the stationary seal ring 160 is coupled to the gland 130 by the shuttle 170 and an inboard housing 190, as described below.

A follower element 180 is positioned at a rear side of the stationary seal ring 160 and is biased there by a biasing element, such as the spring 185. The follower 180 and spring 185 work to bias the stationary seal ring 160 against the rotatable seal ring 150. An inboard housing 190 is coupled to the shuttle 170 by a drive pin 195 to prevent rotation of the inboard housing 190 relative to the shuttle 170. A fourth seal 193, such as an O-ring, may be provided to form a seal between the shuttle 170 and the inboard housing 190, while a fifth seal 194 may be provide a seal between the inboard housing 190 and the gland 130. A second pin 197 may be mounted in the inboard housing 190 and gland 130 to ensure the proper angular positioning of the inboard housing 190 relative to the gland 130.

Referring again to FIG. 1, a rotary holder 200 is rotatably coupled to the sleeve 110 by the use of a third pin 202. A sixth seal 201, such as an O-ring, may be provided to provide a seal between the rotary holder 200 and the sleeve 110. A second rotatable seal ring 151 and the second stationary seal ring 161 are also provided and work similarly to the stationary seal ring 160 and rotatable seal ring 150 described earlier. The second rotatable seal ring 151 may be coupled to the rotary holder 200 in the same manner that the rotatable seal ring 150 is coupled to and hence rotates with the sleeve 110. A seventh seal 203 may provide a seal between the rotary holder 200 and the second rotatable seal ring 151. An outboard housing 230 with an eighth seal 231 and a ninth seal 232 provide a seal between the gland 130 and second stationary seal ring 161.

At the external side 102 of the mechanical seal 100, a spring retainer 210 is mounted onto at least one spacing pin 270 affixed to the outboard housing 230. A second spring 215 biases a spring carrier 220 against the second stationary seal ring 161.

The mechanical seal 100 of FIG. 1 is a tandem seal, providing two balanced seals. Although the spacing mechanism of the invention is illustrated for use in this type of seal, other seal types, such as those listed above, can also be used. A first of these seals is between the rotatable seal ring 150 and stationary seal ring 160; the second seal being between the second rotating seal ring 151 and second stationary seal ring 161. Further examples of mechanical seals can be found in U.S. Pat. Nos. 5,213,340, 5,333,882 and 5,489,105, the contents of which are hereby incorporated by reference. As described above, the invention is applicable to a wide variety of mechanical seals.

The present invention involves the use of one or more spacing mechanisms 244 to position one or more of the rotatable parts of the seal, such as one or more of rotatable seal components 250, 260, 110, 120, 145, 150, 200, 201, 202, 203, and 151 relative to the rest of the mechanical seal 100, which is considered to be stationary. As used herein, the shaft 115 may optionally also be considered a rotatable seal component, in that the spacing mechanism may engage and/or position the shaft relative to the stationary components of the mechanical seal 100. According to the teachings of the invention, one or more spacing mechanisms 244 may be used for radial and/or axial positioning of the rotatable parts. The spacing mechanism 244, according to one embodiment, includes a spacing clip 240 to position at least one rotatable component relative to at least one stationary component of the mechanical seal 100. As illustrated by way of example in FIG. 1, a plurality of spacing clips 240 can engage a lock ring 250 to position the sleeve 110 and therefore may simultaneously position the rotatable components coupled to the sleeve 110 relative to the stationary components coupled to the gland 130. A set screw 260 can be used to secure the lock ring 250 to the sleeve 110 and/or shaft 115.

The spacing clips 240 may each be mounted to a spacing pin 270. The spacing clips 240 may be press fit to the spacing pin 270 or may be mounted to the spacing pin 270 as described herein in relation to other embodiments. The spacing pin 270 may also be a part of the spacing mechanism 244.

Figure 2:
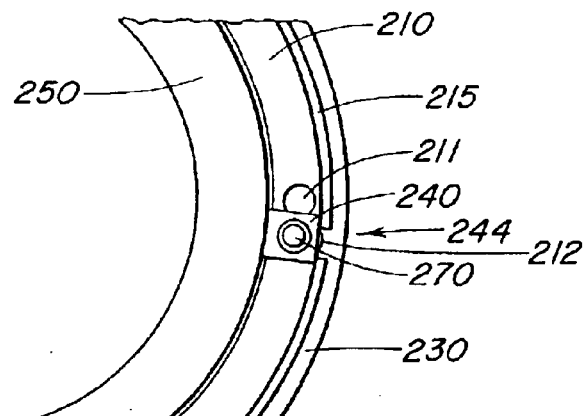
FIGS. 2 and 3 are top views of a portion of the mechanical seal of FIG. 1 illustrating movement of a spacing mechanism during use.

The spacing pins 270 may be mounted through the spring retainer 210 and into the outboard housing 230, as shown in FIG. 1. FIG. 2 illustrates a top view of components removed from the gland 130 for illustration purposes. A spacing clip 240 is shown mounted on a spacing pin 270 through the spring retainer 210 and spring carrier 215 onto the outboard housing 230. The spacing clip 240 is engaging the lock ring 250. According to one implementation of the invention, the spacing clip 240 is positioned to engage the lock ring 250 when the shaft 115, and therefore also lock ring 250, are at rest, e.g. not rotating.

Figure 3:
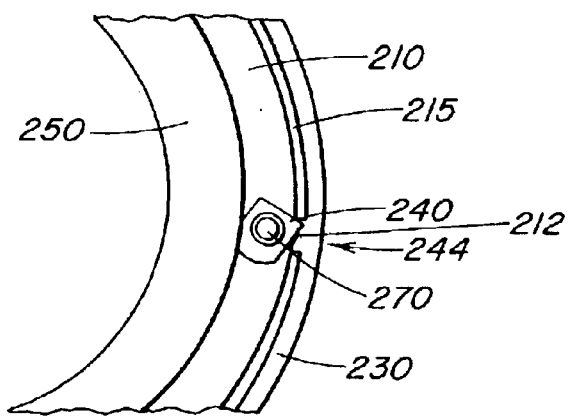
Figure 4:
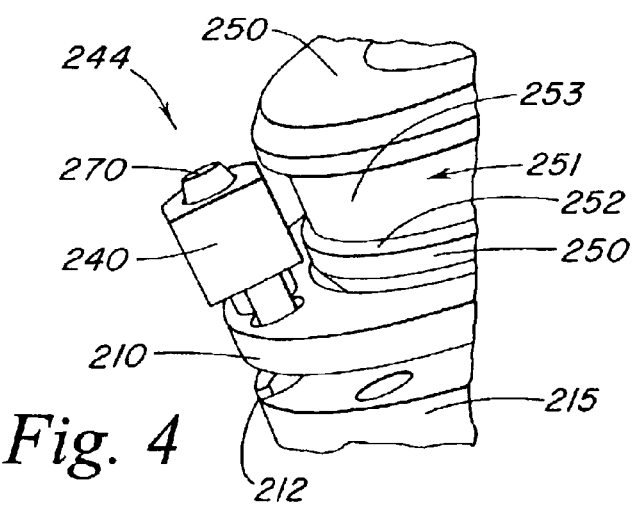
FIG. 4 is a perspective view of the spacing mechanism and a locking ring according to the teachings of the invention.

The spacing pin 270 can be inserted through the hole 211 in the spring retainer 210. A slot is provided in which a thin portion of the spacing pin 270 fits while the spring retainer 210 is rotated into the position shown in FIG. 2, see also FIG. 1. By locating a thin portion of the spacing pin 270 within the slot, or a hole having a reduced diameter, the spacing pin 270 can hold the spring retainer 210 in place axially. A notch 212 in the perimeter of the spring carrier 215 at the location of the spacing pin 270 as illustrated in FIGS. 2–4 can provide a location for the spacing pin 270 to go through the spring carrier 215 and prevent rotation of the spring carrier 215. It is understood that the spacing pin 270 need not be formed with a thin portion and hole 211 and/or slot need not be provided. The spacing pin 270 may be mounted in a wide variety of configurations.

The invention provides for the automatic disengagement of one or more spacing clips 240 from the lock ring 250. As used herein, disengagement from the shaft and/or rotatable components includes disengagement from the shaft 115 and/or hardware rotating with the shaft 115, such as, for example, a lock ring 250. As illustrated in FIG. 3, the spacing clip 240 rotates about a spacing pin 270 to provide for disengagement of the lock ring 250. The disengagement typically occurs upon rotation of the shaft 115. As illustrated in FIG. 3, the spacing clip 240 rotates about spacing pin 270 by the rotation of the shaft 115 and therefore the lock ring 250. The lock ring 250 may optionally be considered part of the spacing mechanism 244.

FIG. 4 illustrates a further implementation of the invention including a groove 251 within the lock ring 250. By the use of the groove 251, the one or more spacing clips 240 may be used to radially and/or axially locate at least one rotatable component of the mechanical seal 100 relative to at least one stationary component of the mechanical seal 100. The spacing clips 240 are sized so that a portion of them may fit within the groove 251. This allows the spacing clip 240 to secure the longitudinal positioning of the mechanical seal 100 relative to the shaft 115 by contact of the spacing clip 240 with one or more radial walls 252 of the groove 251. Alternatively or in addition, an inner wall 253 of the groove 251 may contact the spacing clip 240 to provide radial location of at least one rotatable component relative to at least one stationary component of the mechanical seal 100.

As illustrated in FIG. 4, the spacing clip 240 may rotate fully away from the lock ring 250 during disengagement from the lock ring 250, although the invention is not so limited. The rotation of the spacing clip 240, as shown in FIG. 3, may also be sufficient for disengagement from the lock ring 250. Disengagement from the lock ring 250 may also be defined as disengagement from the inner wall 253 and/or a radial wall 252 of the lock ring 250.

It is understood that a groove, ridge, or other structure to facilitate axial positioning of at least one rotatable component relative to at least one stationary component of the mechanical seal 100 by the use of a spacing clip may be located on the lock ring 250, sleeve 110, shaft 115, or other components. These and other variations are to be considered within the scope of the invention.

A further implementation of the invention is illustrated in FIGS. 5–8. A mechanical seal 300 is illustrated in cross-sectional view, having components similar to those illustrated and described above in relation to mechanical seal 100 of FIG. 1, with like element numbers illustrating elements similar to those discussed in relation to mechanical seal 100. One distinction of the mechanical seal 300 involves the mounting of the one or more spacing clips 240 of the spacing mechanism. Specifically, in the implementation illustrated in FIG. 5, a pin 271 is mounted directly to the gland 131.

Figure 5:
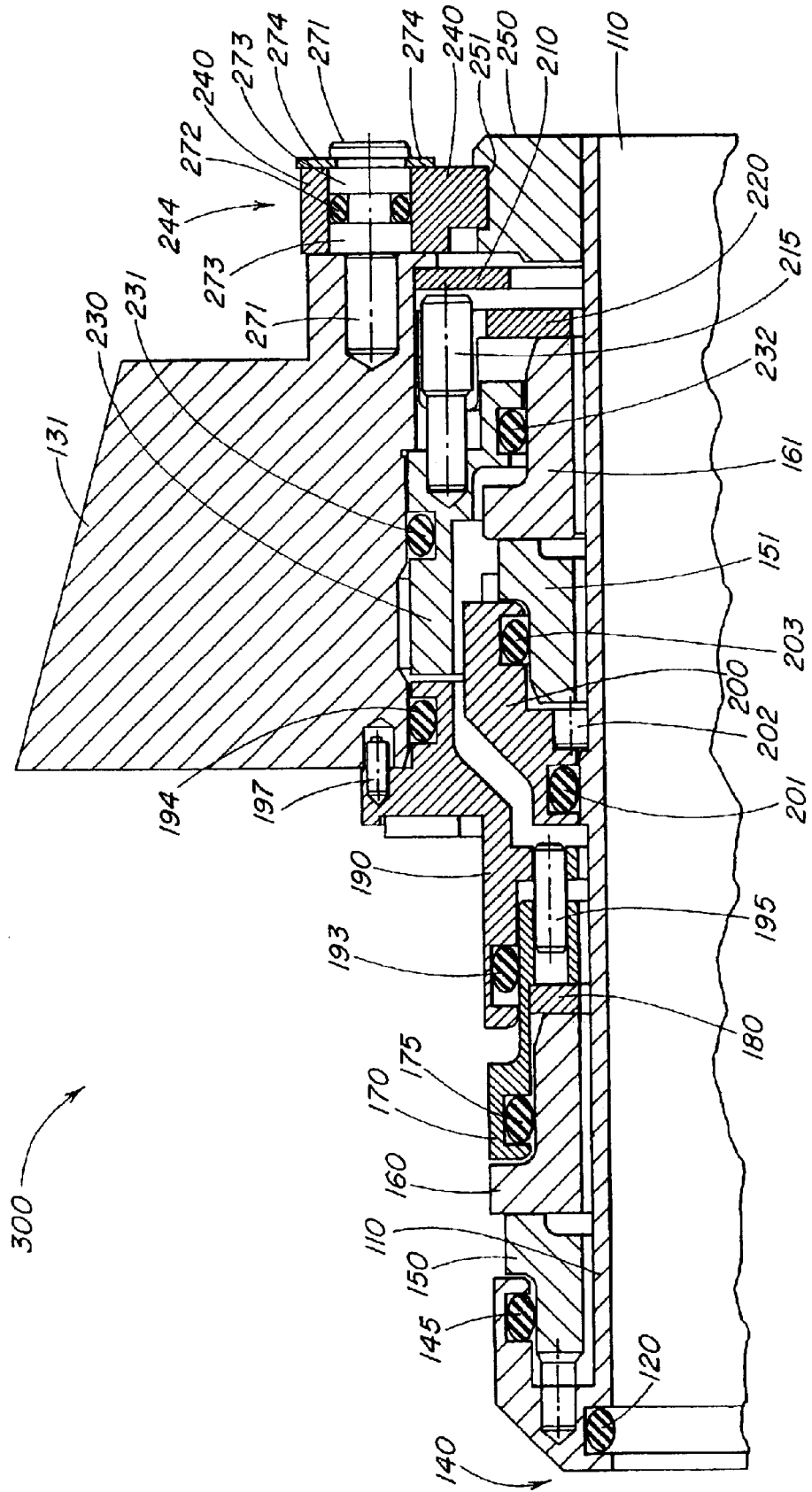
FIG. 5 is a cross-sectional view of another embodiment of the mechanical seal according to the teachings of the present invention.

With further reference to FIG. 5, as described above in relation to the mechanical seal 100, the spacing clip 240 is adapted to rotate about the spacing pin 271. In the illustrated embodiment, an O-ring 272 may be provided to inhibit rotation of the spacing clip 240 about the spacing pin 271. Washers 273 are also provided to assist in the axial positioning of spacing clip 240 with respect to the pin 270 and therefore the gland 131. The use of an O-ring 272 and/or washers 273 may also be used with other embodiments and implementations of the invention, such as a mechanical seal 100 of FIG. 1. The pins of the invention, such as spacing pin 270 of FIG. 1 and/or the spacing pin 271 of FIG. 5, may be mounted by the use of a press fit into another component, such as the outboard housing 230, and/or the gland 130/131. The spacing pin 270, 271 may also or alternatively be mounted by the use of a retaining clip 274 or by other means apparent to those of skill in the art. The spacing clip 240 may be formed of material known in the art, such as non-sparking material including bronze, aluminum bronze, plastic or composite material.

The embodiment of FIG. 5 can provide a more robust mounting position for the spacing clip and/or spacing pin, as the gland 131 is mounted directly to a supporting structure. Also, more space for location and operation of the spacing clip may be provided, as the gland 131 provides substantial flexibility for mounting of the pin and/or spacing clip according to the invention.

Figure 6:
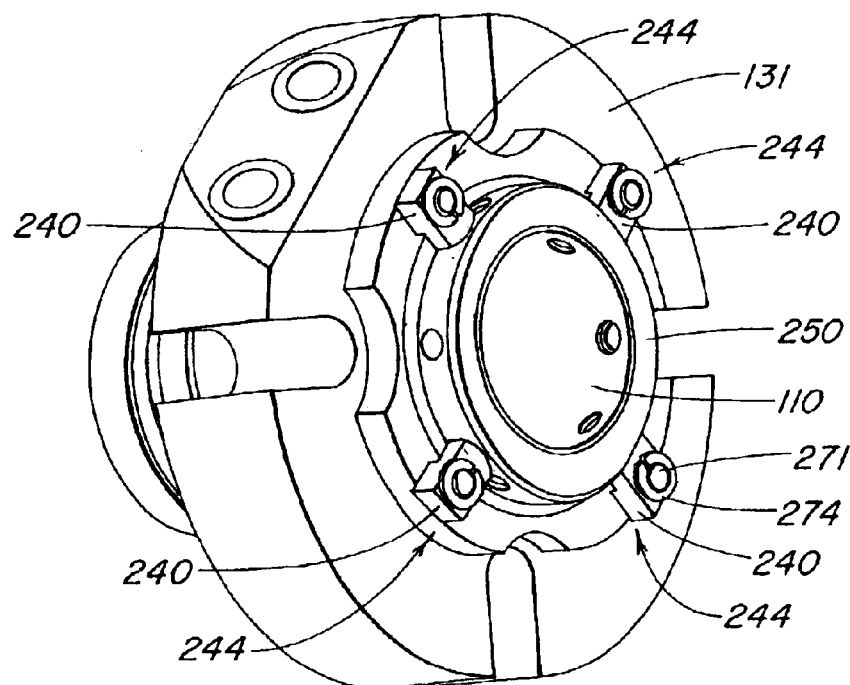
FIGS. 6–8 are perspective views of a mechanical seal according to an implementation of the present invention.
Figure 7:
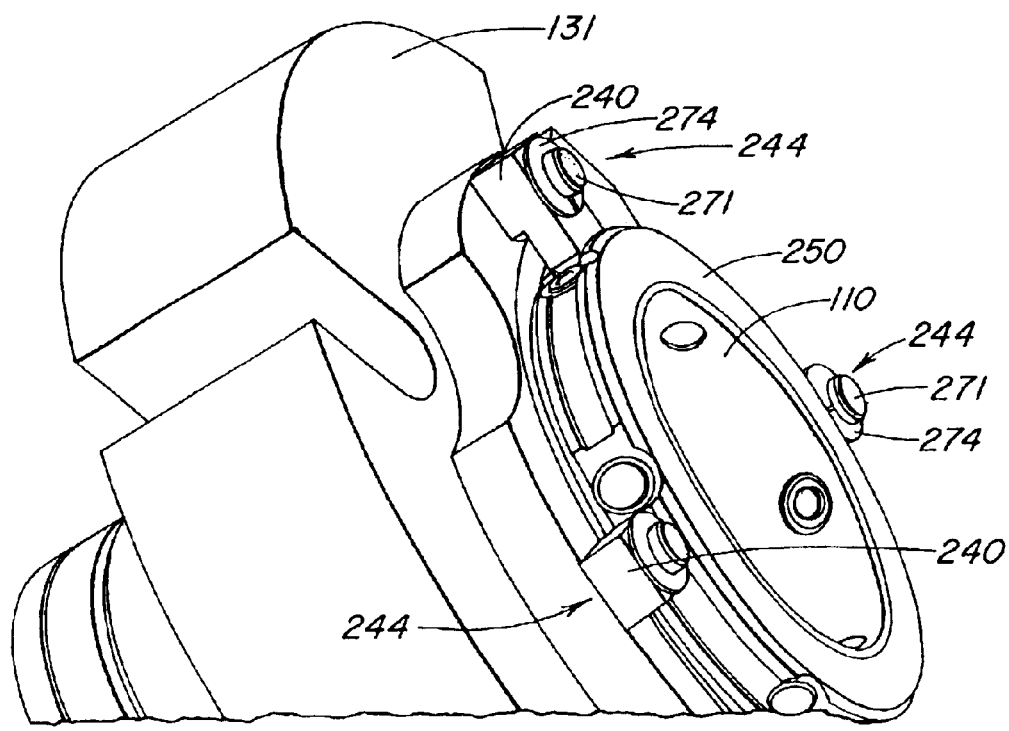
Figure 8:
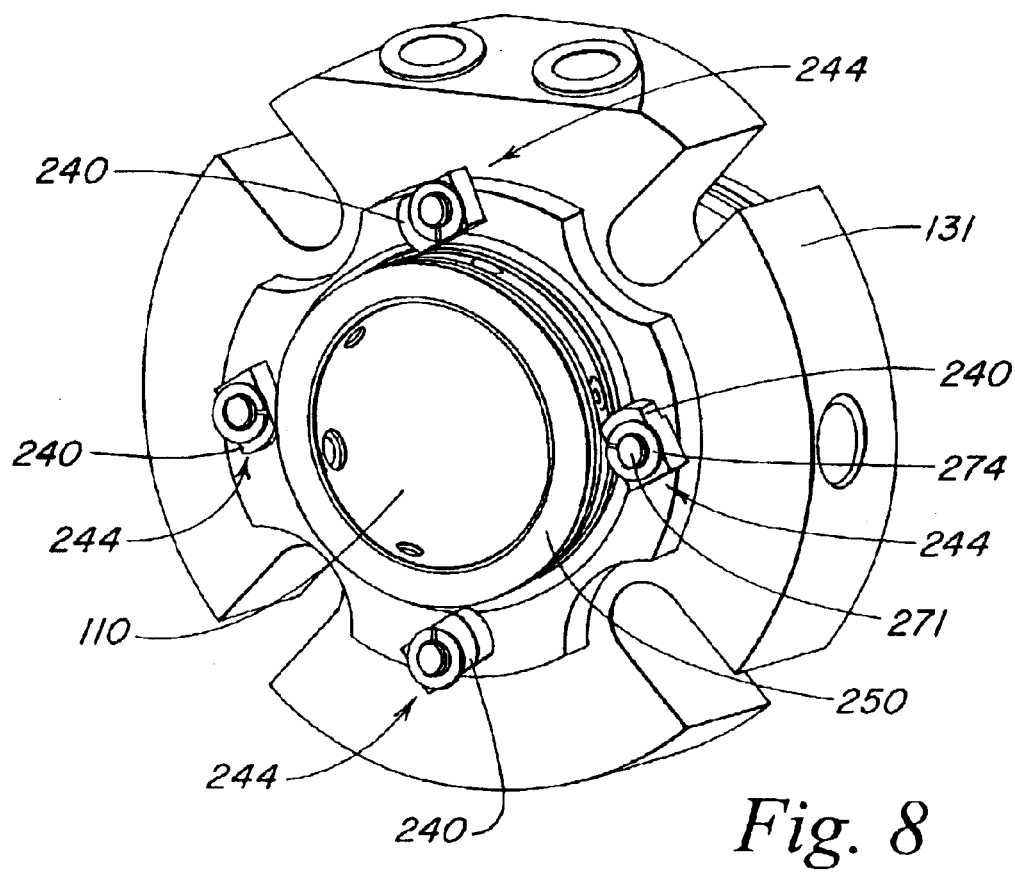

As shown in FIG. 6, a plurality of spacing clips 240 are engaged within the groove 251 of the lock ring 250. As described above, such an engagement is performed when the lock ring 250 is at rest. An additional illustration of the groove 251 and spacing clips in an engaged position is provided in FIG. 7. FIG. 8 illustrates the spacing clips 240 in a disengaged position.

Upon rotation of the lock ring 250, the spacing clips 240 according to the invention will disengage from the lock ring 250, or in other implementations, will disengage directly from other hardware associated with the shaft 115, such as the sleeve 110.

Figure 9:
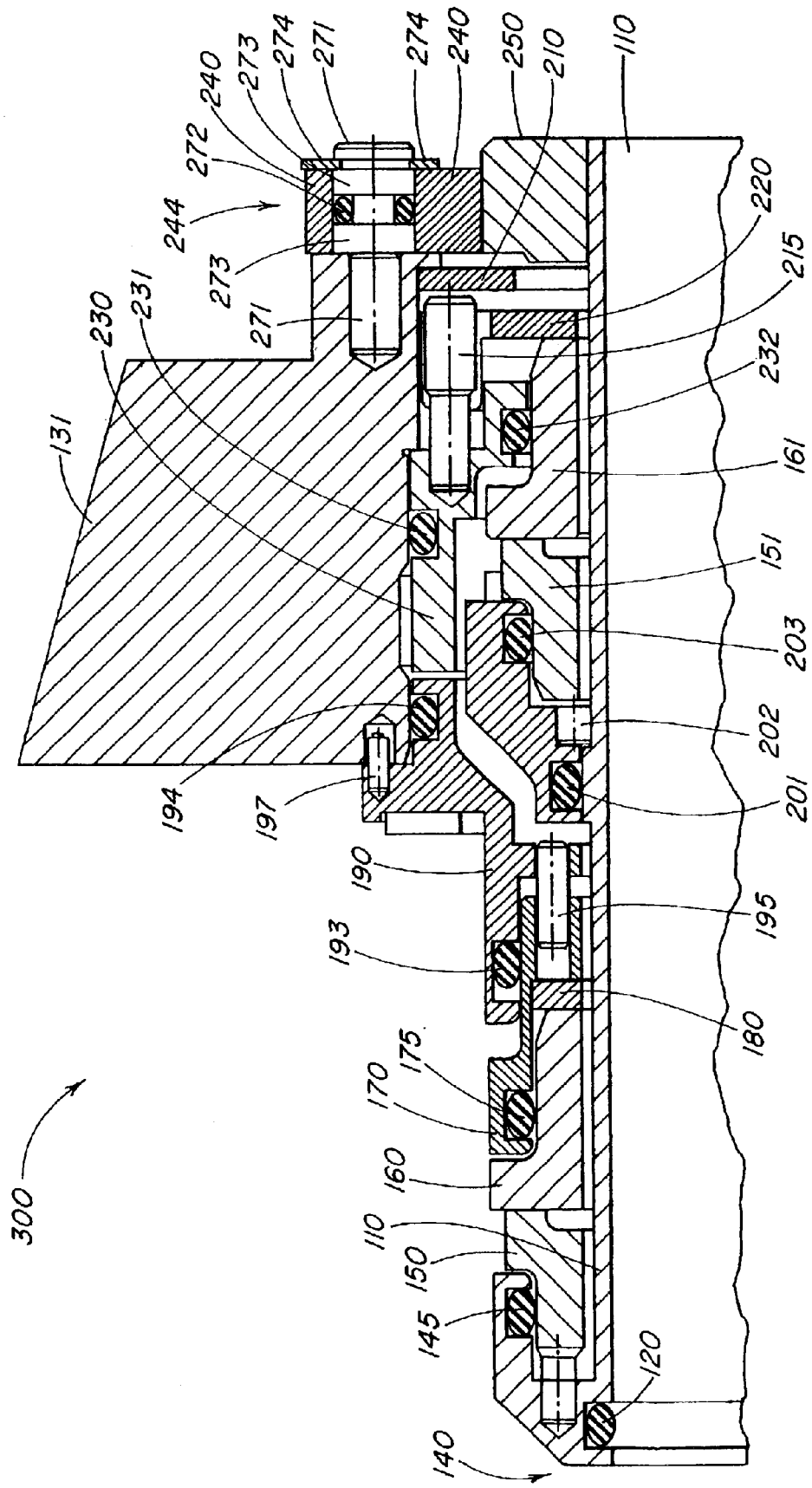
FIG. 9 is a cross-sectional view of a further embodiment of the mechanical seal having a spacing clip for radial positioning according to an implementation of the present invention.

As shown in FIG. 9, a further illustrated example of the invention provides radial positioning, centering, of at least one rotatable component of the mechanical seal relative to at least one stationary component of the mechanical seal. The spacing clip 240 engages the lock ring 250 to provide the radial positioning.

Figure 10:
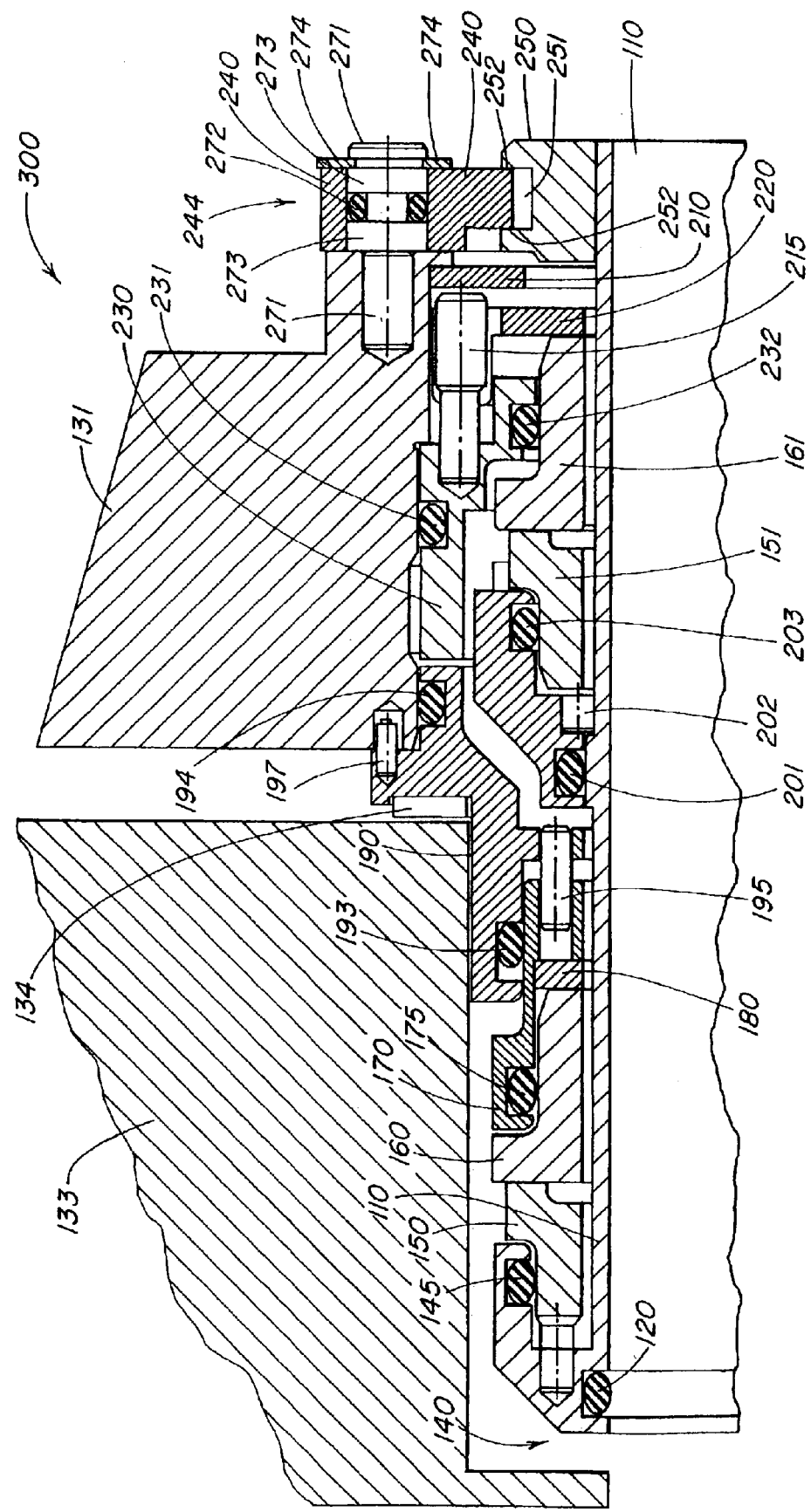
FIG. 10 is a cross-sectional view of a further embodiment of the mechanical seal having a spacing clip for axial positioning according to an implementation of the present invention.

FIG. 10 illustrates a further illustrated example of the invention providing a spacing clip 240 for axial positioning, i.e., setting, of at least one rotatable component of the mechanical seal relative to at least one stationary component of the mechanical seal. The spacing clip 240 engages at least one radial wall 252 of the groove 251 of the lock ring 250 to locate the lock ring 250, and therefore the sleeve 110, relative to the stationary components of the mechanical seal, along an axis parallel to the longitudinal axis of the sleeve 110 and/or shaft 115.

FIG. 10 also illustrates the use of a machine housing 133 in communication with an inboard housing 190. In the illustrated example, the inboard housing 190 is designed to provide a close fit with the machine housing 133 while inhibiting contact between the machine housing 133 and the rotatable components of the mechanical seal, such as the rotatable seal ring 150 and sleeve 110. A gasket 134 may be provided between the machine housing 134 and gland 131. A bearing (not shown) between the machine housing 133 and shaft 115 provides a rotating coupling between the machine housing 133 and shaft. In the illustrated example, a close fit of the machine housing 133 with the inboard housing 190 may provide centering of the rotatable components relative to the stationary components of the mechanical seal.

Figure 11:
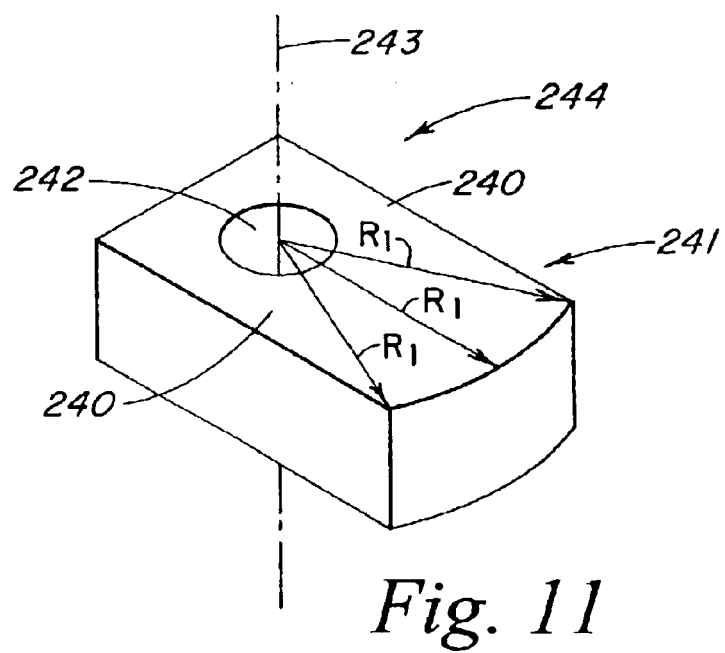
FIGS. 11 and 12 are views of various embodiments of the spacing mechanism according to the present invention.

As shown in FIG. 11, a spacing clip 240 may be provided with an engaging portion 241 engaging the rotatable hardware. The spacing clip 240 may also be provided with a hole 242 for mounting a spacing pin 270. Thus, the spacing clip 240 is adapted to rotate about an axis 243, such as an axis formed by rotation about a spacing pin 270. The axis 243 will allow for rotation of the spacing pin 270 to engage and disengage the rotatable hardware. Axis 243 may be parallel to the longitudinal axis of the shaft 115.

According to one implementation of the invention, the engaging portion 241 of the spacing clip 240 defines a constant radius R1 from said axis 243 to an end of the engaging portion 241 so that the spacing clip 240 may rotate about the axis 243 upon rotation of a shaft 115 without binding up. Particularly when the spacing clip 240 provides relative radial positioning of seal components, binding up of the spacing clip 240 and the shaft 115 can be prevented by the constant radius $R_1$ maintaining a constant distance between the axis 243 and the shaft 115 during rotation of the spacing clip 240 as the spacing clip 240 is rotating to disengage from the rotatable hardware.

Figure 12:
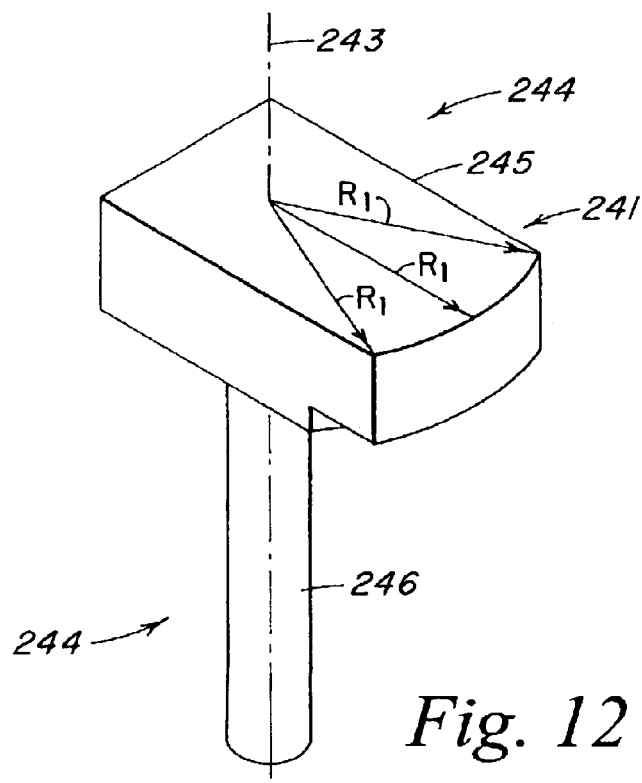

A further embodiment of the spacing mechanism of the invention is illustrated in FIG. 12, in which the spacing clip 245 includes an integral pin 246 that provides for rotation of the spacing clip 245 about the axis 243. Functionality of the spacing clip 245 is similar to the spacing clip 240 of FIG. 11, as the integral pin 246 functions similarly to the spacing pin 270 mounted within the hole 242 of the spacing clip 240. FIG. 12 also illustrates an optional notch resulting in a smaller engaging portion 241, such as for use with a groove 251 of a specified width.

The rotation of the spacing clip about an axis may be inhibited so as to maintain disengagement, or retraction, of the spacing clip from the shaft and/or associated hardware after initial disengagement of the spacing clip.

It is understood that the spacing mechanism of the present invention may be used with any mechanical seal capable of use with spacing clips known in the art.

A further implementation of the invention may involve internally locating the spacing mechanism within the mechanical seal 100. By way of example, the spacing mechanism may be mounted on the inboard housing 190 or the outboard housing 230 and engage the rotary holder 200. It is understood that the spacing mechanism may be exposed to a fluid within the mechanical seal 100.

Optionally, the spacing mechanism may be located on one or more rotatable components of the mechanical seal and configured to engage stationary components of the mechanical seal. By way of example, spacing pins 270 could be located in the lock ring 250 and a surface or groove formed in a gland 130 to provide for the spacing clip 240 to engage at least one stationary component of the mechanical seal. Disengagement could be performed upon the rotation of the rotatable components of the mechanical seal, such as upon rotation of the shaft.

The materials used to form the components of the present invention are those known in the art for forming mechanical seals and spacing clips. As noted above, a variety of materials are available for spacing clips, as the spacing clips need not be made of a wearable material.

Figure 13:
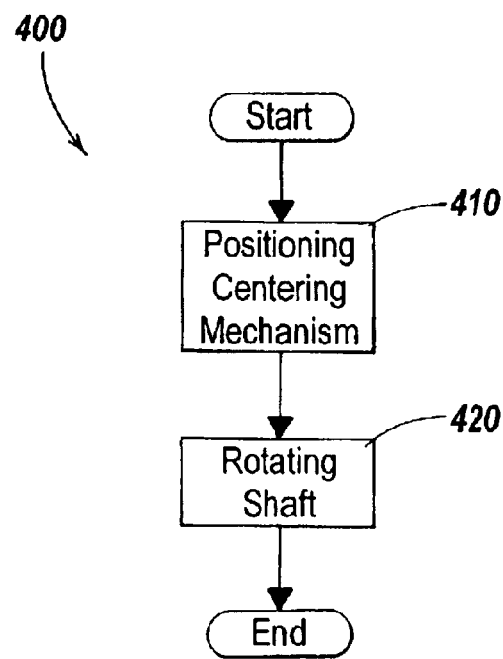
FIG. 13 is a flow chart diagram illustrating a method of using the spacing mechanism according to the teachings of the present invention.

The invention provides a method 400 including the steps of positioning at least one spacing mechanism to position or locate rotatable components with respect to stationary components of the mechanical seal, step 410, as illustrated in FIG. 13. The method 400 includes the step of rotating the shaft to automatically disengage the spacing mechanism from the rotatable components, step 420.

Referring again to FIG. 13, the spacing mechanism has at least one spacing clip in a first, engaged position such that the spacing clip has an engaging portion that can engage the rotatable components when the shaft is at rest. According to this implementation, the engaging portion is moveable relative to the shaft. Rotating the shaft automatically moves the spacing clip to the second, disengaged position such that the spacing clip is disengaged from the rotatable components.

All documents or publications cited herein are incorporated in their entirety herein by reference. The present invention has been described by way of example, and modifications and variations of the described embodiments will suggest themselves to skilled artisans in this field without departing from the spirit of the invention. Aspects and characteristics of the above-described embodiments, examples and implementations may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A spacing mechanism for locating a rotatable seal component relative to a stationary seal component of a mechanical seal, wherein said spacing mechanism has an engaging portion adapted to rotate about an axis and engages said rotatable seal component when said rotatable seal component is at rest and is movable relative to said rotatable seal component, said engaging portion of said spacing mechanism being constructed and located such that said engaging portion automatically disengages from said rotatable seal component upon rotation of said rotatable seal component and wherein said spacing mechanism is formed having a spacing clip with an integral pin for mating with said mechanical seal and said axis is defined by said integral pin.

2. The spacing mechanism of claim 1, wherein said engaging portion of said spacing mechanism defines a constant radius about said axis.

3. The spacing mechanism of claim 1, wherein said spacing mechanism provides radial positioning of said rotatable seal component relative to said stationary seal component.

4. The spacing mechanism of claim 1, wherein said spacing mechanism provides axial positioning of said rotatable seal component relative to said stationary seal component.

5. The spacing mechanism of claim 1, wherein said rotatable seal component comprises a lock ring adapted to be mounted to a shaft, wherein said spacing mechanism engages a groove of said lock ring.

6. The spacing mechanism of claim 1, wherein said rotatable seal component comprises a sleeve adapted to be mounted to a shaft.

7. The spacing of claim 1, wherein said rotatable seal component comprises a shaft.

8. A mechanical seal for providing a seal along a shaft, comprising:
rotatable seal components adapted to be coupled to said shaft, wherein said rotatable seal components includes a rotatable seal ring and a lock ring mounted to said shaft;
a gland;
a stationary seal ring coupled to said gland and interfacing with said rotatable seal ring; and
a spacing mechanism mounted to at least one of said gland and said stationary seal ring;
wherein said spacing mechanism engages said lock ring and is adapted to extend toward and engage at least one of said rotatable seal components to locate said rotatable seal ring relative to said stationary seal ring before said shaft is rotating and retract from at least one of said rotatable seal components upon rotation of said shaft.

9. The mechanical seal of claim 8, wherein said lock ring is provided with a groove to accommodate an end of said spacing mechanism for locating said stationary seal ring relative to said rotatable seal ring along an axis of said shaft.

10. The mechanical seal of claim 8, wherein said spacing mechanism provides radial positioning of said rotatable seal ring relative to said stationary seal ring.

11. The mechanical seal of claim 8, wherein said spacing mechanism provides axial positioning of said rotatable seal ring relative to said stationary seal ring.

12. The mechanical seal of claim 8, wherein said spacing mechanism is adapted to retract from at least one of said rotatable seal components by rotation of said shaft.

13. A spacing mechanism for a mechanical seal, comprising:
a spacing pin mounted to at least one stationary component of said mechanical seal; and
at least one spacing clip mounted to said spacing pin and movable relative to a rotatable seal component to engage and to disengage from said rotatable seal component;
wherein said spacing clip engages said rotatable seal component when said rotatable seal component is at rest and disengages from said rotatable seal component upon rotation of said rotatable seal component.

14. The spacing mechanism of claim 13, wherein said spacing clip is adapted to rotate about an axis to disengage said from rotatable seal component.

15. The spacing mechanism of claim 13, further comprising an O-ring mounted to said spacing pin to inhibit rotation of said spacing clip relative to said spacing pin.

16. The spacing mechanism of claim 13, further comprising a retaining clip mounted to said spacing pin to retain said spacing clip on said spacing pin.

17. The spacing mechanism of claim 13, wherein said spacing clip is press-fit mounted to said spacing pin.

18. The spacing mechanism of claim 13, wherein said spacing clip can engage said rotatable seal component when said rotatable seal component is at rest by the use of an engaging portion, said engaging portion of said spacing clip defining a constant radius about said spacing pin.

19. The spacing mechanism of claim 13, wherein said spacing clip is adapted to disengage from said rotatable seal component by rotation of said rotatable seal component.

20. The spacing mechanism of claim 13, wherein said rotatable seal component comprises a lock ring and wherein said spacing mechanism engages at least one radial wall of a groove of said lock ring.

21. A centering mechanism for a mechanical seal, comprising:
a spacing pin mounted to at least one stationary component of said mechanical seal and defining a first axis along a longitudinal axis of said spacing pin; and
a centering clip mounted to said spacing pin and movable about said first axis and having a constant radius from said first axis along one end of said centering clip adapted for engagement with a rotatable seal component when said rotatable seal component is at rest;
wherein said centering clip disengages from said rotatable seal component by rotation of said rotatable seal component.

22. A mechanical seal for providing a seal along a shaft, comprising:
a rotatable seal ring adapted to be coupled to said shaft;
a gland;
a stationary seal ring coupled to said gland and interfacing with said rotatable seal ring;

a pin, mounted to at least one of the group of said gland and said stationary seal ring;

a lock ring mounted to said shaft; and a spacing clip, mounted to said spacing pin and movable relative to said lock ring to engage and disengage from said lock ring to position said rotatable seal ring relative to said stationary seal ring whenever said spacing clip is engaged with said lock ring;

wherein said spacing clip is adapted to engage said lock ring when said shaft is at rest and disengage from said lock ring upon rotation of said shaft.

23. The mechanical seal of claim 22, wherein said lock ring is provided with a groove to accommodate an end of said spacing clip for axially locating said rotatable seal ring relative to said stationary seal ring along an axis of said shaft.

24. The mechanical seal of claim 22, wherein said spacing clip provides radial positioning of said rotatable seal ring relative to said stationary seal ring.

25. The mechanical seal of claim 22, wherein said spacing pin is mounted to said gland by way of an outboard housing.

26. The mechanical seal of claim 22, wherein said spacing pin is mounted directly to said gland.

27. The mechanical seal of claim 22, further comprising an O-ring mounted to said spacing pin to inhibit rotation of said spacing clip relative to said spacing pin.

28. The mechanical seal of claim 22, further comprising a retaining clip mounted to said spacing pin to retain said spacing clip on said spacing pin.

29. The mechanical seal of claim 22, wherein said spacing clip is press-fit mounted to said spacing pin.

30. The mechanical seal of claim 22, wherein said spacing clip is adapted to retract from said shaft by rotation of said shaft.

31. A method of operating a mechanical seal having a spacing mechanism, comprising the step of:

positioning a plurality of spacing mechanisms to engage a rotatable seal component at rest to radially locate said rotatable seal component relative to a stationary seal component; and rotating said rotatable seal component to automatically disengage said spacing mechanism from said rotatable seal component.

32. The method of claim 31, wherein said positioning step includes locating at least one of said plurality of spacing mechanisms to rotate about an axis.

33. The method of claim 31, wherein said positioning step includes locating at least one of said plurality of spacing mechanisms such that said spacing mechanism has a distal end extending radially from said axis, said distal end defining a constant radius from said axis.

34. The method of claim 31, wherein said positioning step includes locating at least one of said plurality of spacing mechanisms such that said spacing mechanism engages at least one radial wall of a groove of lock ring mounted to a shaft to axially locate said rotatable seal component relative to said stationary seal component of said mechanical seal.

35. The method of claim 31, wherein said positioning step includes locating at least one of said plurality of spacing mechanisms such that said spacing mechanism has a spacing clip having and integral pin for mating with said mechanical seal and said axis is defined by said integral pin.

36. The method of claim 31, wherein said positioning step includes locating at least one of said plurality of spacing mechanisms to include a spacing clip to rotate about a spacing pin.

37. A spacing mechanism for locating a rotatable seal component relative to a stationary seal component of a mechanical seal, wherein said spacing mechanism has an engaging portion adapted to rotate about an axis and engage said rotatable seal component when said rotatable seal component is at rest and is movable relative to said rotatable seal component, said engaging portion of said spacing mechanism being constructed and located such that said engaging portion automatically disengages from said rotatable seal component upon rotation of said rotatable seal component and wherein said spacing mechanism includes a spacing pin, wherein said engaging portion of said spacing mechanism is adapted to rotate about a spacing pin, said spacing pin defining said axis.

38. The spacing mechanism of claim 37, wherein said engaging portion of said spacing mechanism defines a constant radius about said axis.

39. The spacing mechanism of claim 37, wherein said spacing mechanism provides radial positioning of said rotatable seal component relative to said stationary seal component.

40. The spacing mechanism of claim 37, wherein said spacing mechanism provides axial positioning of said rotatable seal component relative to said stationary seal component.

41. The spacing mechanism of claim 37, wherein said rotatable seal component comprises a lock ring adapted to be mounted to a shaft, wherein said spacing mechanism engages a groove of said lock ring.

42. The spacing mechanism of claim 37, wherein said rotatable seal component comprises a sleeve adapted to be mounted to a shaft.

43. The spacing mechanism of claim 37, wherein said rotatable seal component comprises a shaft.

* * * * *